United States Patent
Sho et al.

(10) Patent No.: US 8,419,415 B2
(45) Date of Patent: Apr. 16, 2013

(54) SYSTEMS AND METHODS OF FEEDING HOOK FASTENING ELEMENTS INTO A MOLD ASSEMBLY LINE

(75) Inventors: Yoshiyuki Sho, Toyama (JP); Yoshifumi Nakata, Marietta, GA (US); Hisashi Yoneshima, Macon, GA (US); Tomonari Yoshida, Novi, MI (US); Takanori Yoshida, Atlanta, GA (US)

(73) Assignee: YKK Corporation (JP)

( * ) Notice: Subject to any disclaimer, the term of this patent is extended or adjusted under 35 U.S.C. 154(b) by 308 days.

(21) Appl. No.: 12/940,231

(22) Filed: Nov. 5, 2010

(65) Prior Publication Data
US 2012/0114782 A1 May 10, 2012

(51) Int. Cl.
*B29C 70/84* (2006.01)
(52) U.S. Cl.
USPC .................. 425/510; 425/112; 425/126.1
(58) Field of Classification Search ........... 425/510, 425/112, 126.1
See application file for complete search history.

(56) References Cited

U.S. PATENT DOCUMENTS

| | | | |
|---|---|---|---|
| 4,207,044 A * | 6/1980 | Lionello | 425/126.1 |
| 4,673,542 A | 6/1987 | Wigner et al. | |
| 4,708,072 A * | 11/1987 | Frye | 112/470.33 |
| 4,920,904 A * | 5/1990 | Frye | 112/475.01 |
| 4,933,224 A | 6/1990 | Hatch | |
| 5,158,640 A * | 10/1992 | Akiyama | 156/542 |
| 5,614,057 A | 3/1997 | Conley, Jr. et al. | |
| 6,066,833 A | 5/2000 | Rigdon et al. | |
| 7,493,676 B2 | 2/2009 | Murasaki et al. | |
| 2009/0300890 A1 | 12/2009 | Coronel et al. | |
| 2010/0176538 A1 | 7/2010 | Nozawa et al. | |

FOREIGN PATENT DOCUMENTS

JP 2006-205641 A 8/2006

OTHER PUBLICATIONS

International Search Report and Written Opinion, PCT International Patent Application No. PCT/US2011/059039, mailed Mar. 21, 2012.

* cited by examiner

*Primary Examiner* — James Sanders
(74) *Attorney, Agent, or Firm* — Kilpatrick Townsend & Stockton LLP (57) ABSTRACT

Systems and methods for introducing hook fastening elements into a mold traveling along a mold assembly line are disclosed. The system can be configured to cut hook fastening tape into strips having a predetermined length based on information received from the mold assembly line, and to drop the cut strips directly into the mold at the appropriate intervals as the mold travels along the mold assembly line.

19 Claims, 12 Drawing Sheets

SYSTEMS AND METHODS OF FEEDING HOOK FASTENING ELEMENTS INTO A MOLD ASSEMBLY LINE

FIELD OF THE INVENTION

The invention generally relates to systems and methods for introducing cut hook fastening elements into molds traveling along a mold assembly line.

BACKGROUND OF THE INVENTION

Hook and loop fastening structures are used in various applications to secure objects that are adjacent to one another. For example, hook fastening strips, such as those disclosed in U.S. application Ser. No. 12/353,538, which was filed on Jan. 14, 2009 and names Yasutoshi Nozawa and Thanh P. Nguyen as inventors, U.S. application Ser. No. 12/133,572, which was filed on Jun. 5, 2008 and names Wolfgang E. Coronel, Keith D. Kratz, and Cary Maddox as inventors, and U.S. Pat. No. 7,493,676, which issued on Feb. 24, 2009 and names Ryuichi Muraskai and Tsuyoshi Minato as inventors, all three of which are incorporated herein by reference, may be molded onto a surface of a foam bun of an automobile seat, and loop material may be provided on an inner surface of an automobile seat covering to engage the hook fastening strips and secure the seat covering to the foam bun. Hook fastening strips may be utilized on straight portions of the foam bun, such as longitudinally down the center of the bun, or may be disposed on curved portions of the foam bun.

A mold is typically used to form the foam bun of a particular automobile seat. The mold includes trenches for receiving the hook fastening strips before the foam is injected to form the foam bun. Because the molds include trenches of different lengths and different shapes/radii of curvature, hook fastening strips having different lengths are often required to accommodate the various trench lengths and curvatures. In a typical operation, operators position the hook fastening strips into the trenches of the molds as part of an assembly line.

In a conventional facility, a parts rack stores various lengths of pre-cut hook fastening strips. A mold assembly line carrying the molds to be assembled with the hook fastening strips is positioned separate from the parts rack. At least one operator is required to determine which length fastening strips are required to fit the trenches of the mold used to form the foam bun of the particular automobile seat being manufactured. The operator then retrieves from the parts rack the hook fastening strips having the required lengths, and then moves back to the assembly line to assemble the appropriate length hook fastening strips into the mold that is coming down the line. In this way, the operator moves back and forth between the assembly line and the parts rack to retrieve and position within the trenches of the mold hook fastening strips of suitable length.

SUMMARY OF THE INVENTION

Aspects of the invention systems and methods for automating the dropping into a plurality of molds moving along a moving mold assembly line the appropriate number of cut strips of hook fastening tape, where the cut strips of hook fastening tape are cut from a spool of hook fastening tape to a predetermined length based on the particular mold into which they are being dropped. In some implementations, the system includes at least one sensor for sensing the position of the molds as they move along the moving mold assembly line and the predetermined number of strips of hook fastening tape required by the molds, as well as the required length of each of the predetermined number of strips. In some implementations, the system includes a controller, a stepper motor having a variable speed and a cutter that cuts strips of hook fastening tape based on the length required for a particular mold. In some implementations, the system includes a receiving tray having a divider and at least one hinged bottom flap.

In some implementations, the system includes an accumulator, a spool change unit, and/or a joiner for joining two pieces of uncut hook fastening tape.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the following appended figures, in which use of like reference numerals in different features is intended to illustrate like or analogous components.

DETAILED DESCRIPTION OF THE INVENTION

Figure 2:
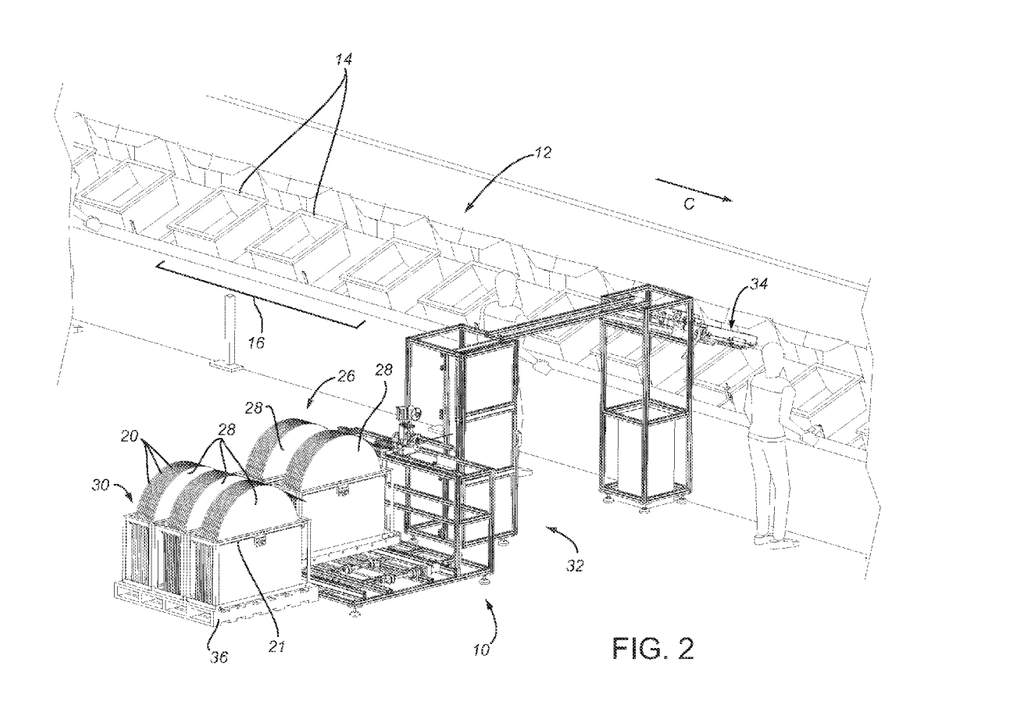
FIG. 2 is a perspective view of a feeder assembly positioned with respect to a mold assembly line.
Figure 3:
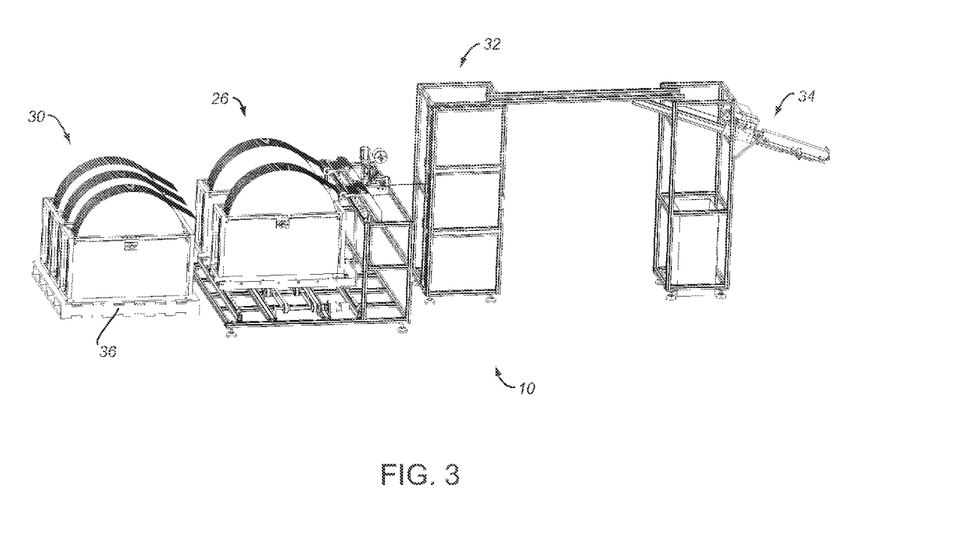
FIG. 3 is a side perspective view of the feeder assembly of FIG. 2.

FIGS. 2-12 show various views of a feeder assembly 10 that supplies hook fastening strips 22 of the appropriate length and at the appropriate intervals to molds 14 traveling in a direction C along a mold assembly line 12, with the mold assembly line 12 being positioned with respect to the feeder assembly 10. As shown in FIGS. 2-3, the feeder assembly 10 comprises a spool change unit 26, an accumulator 32, and a cutting and discharge unit 34. In some implementations, these three units are in communication with one another so that, for example, if one unit malfunctions, the rest of the units also shut down.

Figure 1:
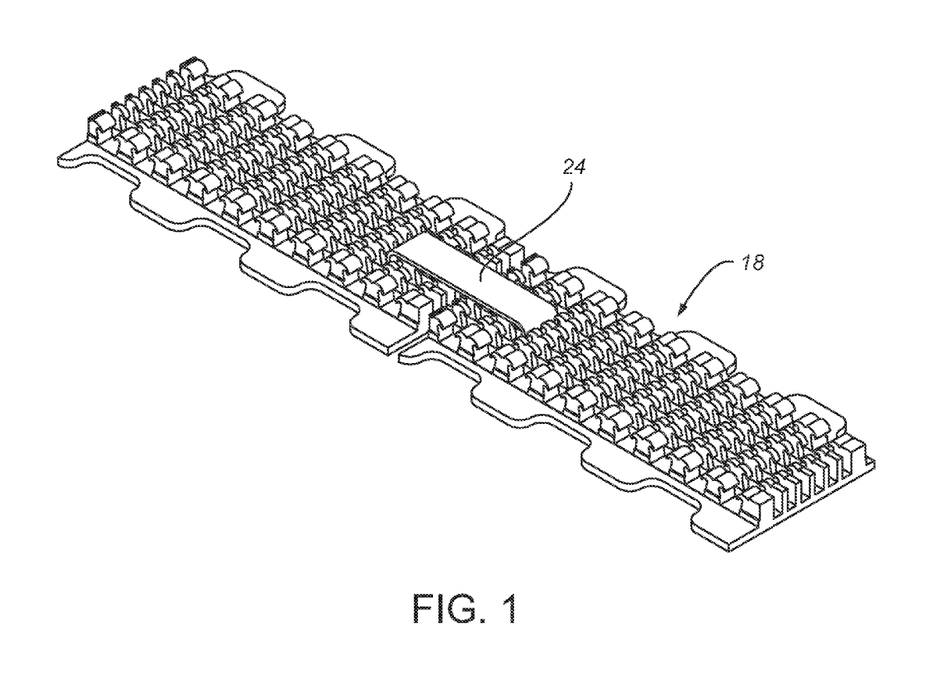
FIG. 1 is a perspective view of two hook fastening strips joined together by an elongated connecting member.

Hook fastening strips 22 having a predetermined length are cut from a spool 20 of hook fastening tape 18 (shown in FIG. 1). Hook fastening tape 18 from different spools or within the same spool can be joined together in an end-to-end relationship by an elongated connecting member, such as staple 24 shown in FIG. 1. In an exemplary system, the diameter of spools 20 is approximately 1000 mm and the length of the hook fastening tape 18 stored on each of the spools 20 is approximately 300 meters resulting in a spool 20 that weighs approximately 5.0 kg. In this exemplary system, approximately ten spools are stored on a spool set 28, as shown in FIG. 2, where the spool set 28 is a grouping of multiple spools. In some systems, spool set 28 is stored on a frame, which can be made of a steel or any other suitable material, such as frame 21 in FIG. 2. The grouping of the spool set 28 and the frame 21 is referred to herein as a spool box (such as spool box 66 or spool box 68 shown in FIG. 4). In the exemplary system, the spool box is approximately 1150 mm wide, 600 mm high, 370 mm deep, and weighs approximately 70.0 kg. The spool box 66 can have other suitable dimensions in other configurations.

FIGS. 2-3 also illustrate an optional spool stock unit 30, which stores additional spool sets 28 of spools 20 of hook fastening tape 18. In the exemplary system shown in FIGS. 2-3, spool stock unit 30 houses three spool sets 28 on a pallet 36. In the system shown in FIGS. 2-3, pallet 36 is approximately 1250 mm long by 1250 mm wide, but can have other suitable dimensions depending on the dimensions of the spool set 28 and the number of spool sets 28 stored on spool stock unit 30. In the system illustrated in FIG. 2, spool stock unit 30 is positioned adjacent to the spool change unit 26, but spool stock unit 30 can be located anywhere.

In the system illustrated in FIGS. 2-6, spool change unit 26 can accommodate up to two spool sets 28. In other systems, spool change unit 26 can accommodate any desired number of spool sets 28. Spool change unit 26 operates to allow hook fastening tape 18 from various spool sets 28 to be fed generally continuously through the feeder assembly 10. The spool change unit 26 illustrated in FIG. 4 includes a right spool box 66 and a left spool box 68, with each spool box accommodating a spool set 28 having ten spools 20 of hook fastening tape 18.

Figure 4:
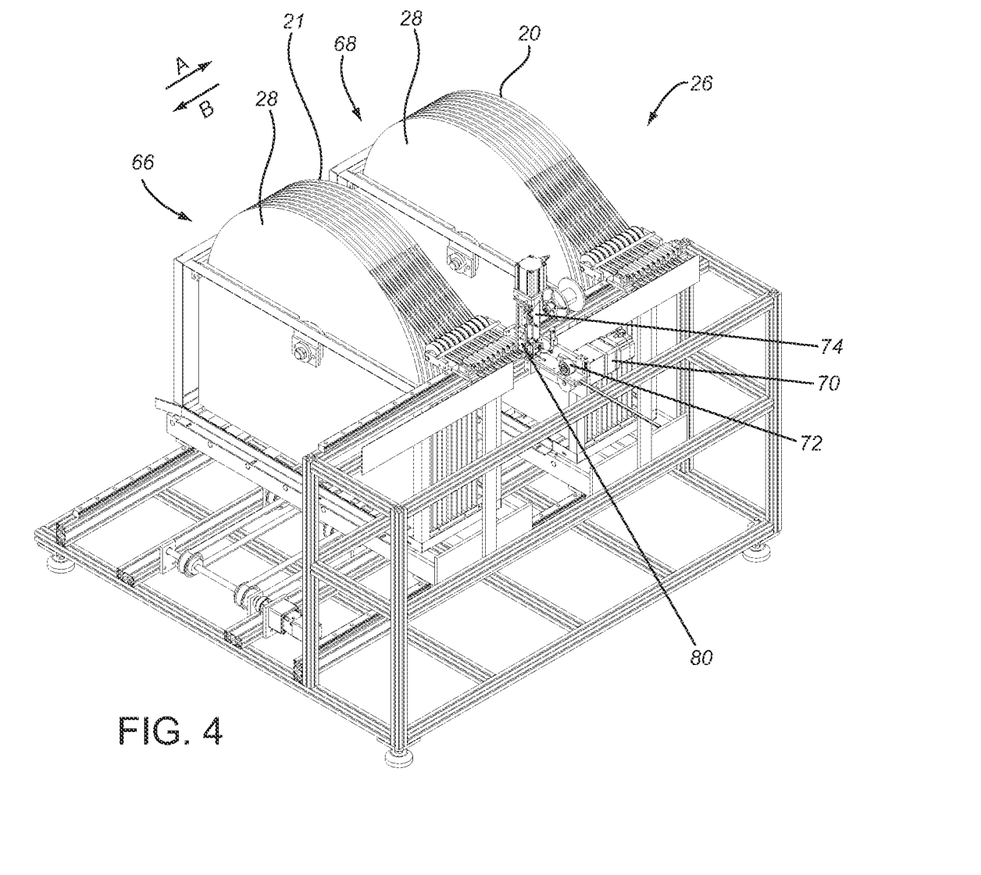
FIG. 4 is a perspective view of a spool change unit of the feeder assembly of FIG. 2.

In some systems, right spool box 66 is adjacent to left spool box 68. In a starting position, right spool box 66 is aligned with respect to feed rollers 72 of spool change unit 26, as illustrated in FIG. 4. When aligned in this manner, the spool 21 of spool set 28 of right spool box 66 closest to left spool box 68 is aligned with rollers 72 so that the hook fastening tape 18 from this particular spool can be fed through rollers 72.

As illustrated in FIG. 4, a feed motor 70 is located between the spool change unit 26 and the accumulator 32 and pulls the hook fastening tape 18 off of a particular spool 20 and through rollers 72. The feed motor 70 is controlled by a controller, such as a programmable logical controller (PLC), which can be any suitable programmable logical controller. The speed of the motor 70 is preprogrammed and the operation of the motor is controlled by various inputs, as discussed further below.

Figure 5:
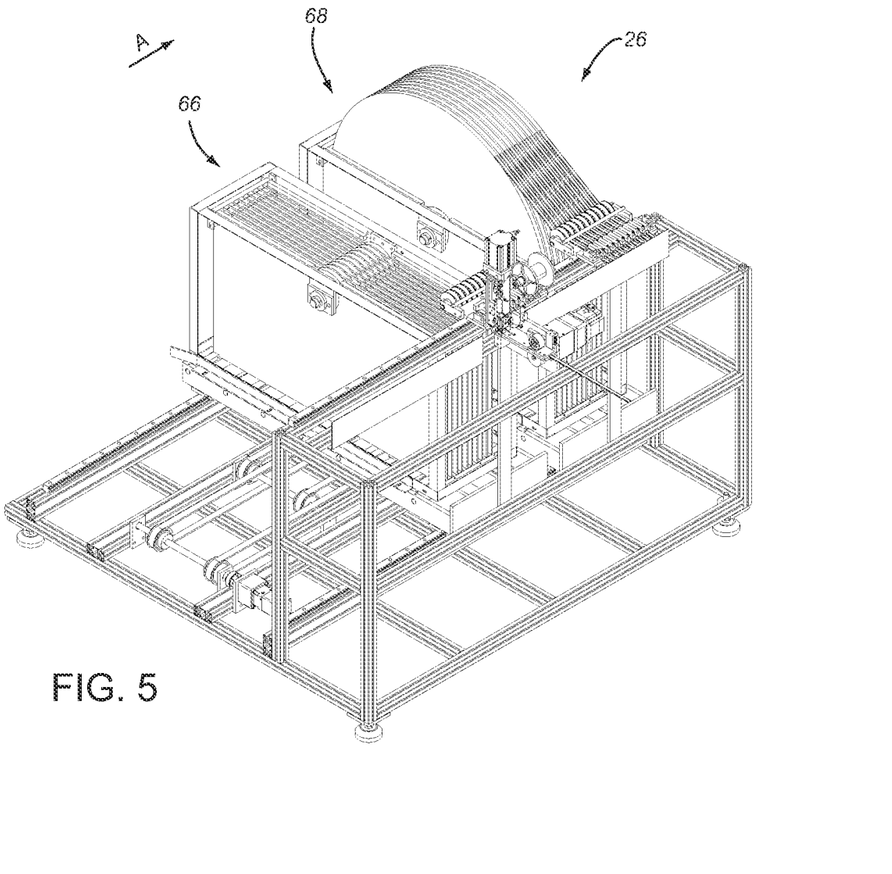
FIG. 5 is a perspective view of the spool change unit of FIG. 4 after one spool box has been removed.
Figure 6:
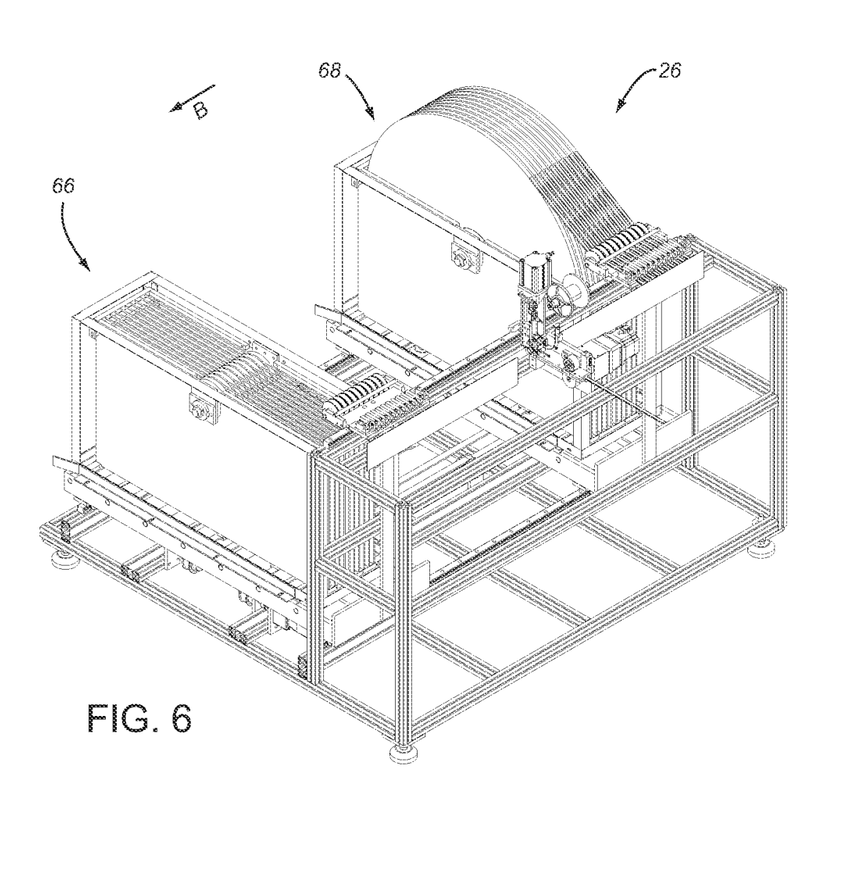
FIG. 6 is another perspective view of the spool change unit of the feeder assembly of FIG. 5.

The spool change unit 26 includes a detector 80 for detecting the presence of hook fastening tape 18 and a joiner 74 for connecting the ends of hook fastening tape 18 using a connecting member (such as a staple) 24. The detector 80 serves as a first input for determining the operation of the motor 70. Specifically, when the detector 80 does not detect the presence of hook fastening tape 18, the detector 80 sends a signal to the PLC controlling the motor 70 to stop the operation of the feed motor 70 thus stop the feeding process. When the detector 80 does not detect the presence of hook fastening tape 18, but hook fastening tape 18 still remains within some of the spools of spool set 28 of right spool box 66, the right spool box 66 moves laterally in the A direction toward the left spool box 68 until the next spool 20 having hook fastening tape 18 is aligned with detector 80 so that detector 80 detects the presence of hook fastening tape 18, the detector 80 sends a signal to the PLC controlling the feed motor 70, and the feeding operation begins again. As the tape 18 from the first spool runs out and tape is provided from the next spool, a joiner 74 staples the ends of the two tapes. This continues until all of the tape of spools on the spool sets 28 of right spool box 66 has been fed through rollers 72 (FIG. 5). Once all of the hook fastening tape 18 on spool set 28 of right spool box 66 has been fed through rollers 72, spool box 66 is moved out of the path of the oncoming left spool box 68, as shown in FIG. 6.

At about the same time as right spool box 66 moves laterally in the B direction, the left spool box 68 also moves laterally in the B direction until it aligns with rollers 72 so that the hook fastening tape 18 housed on the spools 20 of the spool set 28 on left spool box 68 can be pulled through rollers 72 by way of feed motor 70. In some systems, the time associated with changing feeding from one spool set of one box from another spool set of a different box is approximately 5 seconds or less. This process repeats to feed hook fastening tape 18 through the spool change unit 26. Note that the direction of movement is used only as an example, and that the spool boxes can move in other directions in other implementations.

Figure 7:
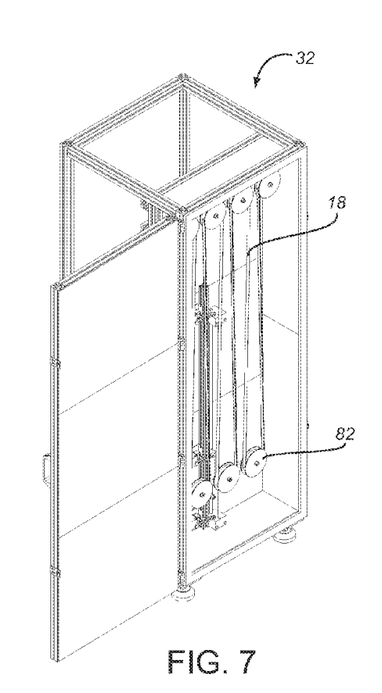
FIG. 7 is a perspective view of an accumulator of the feeder assembly of FIG. 2.
Figure 8:
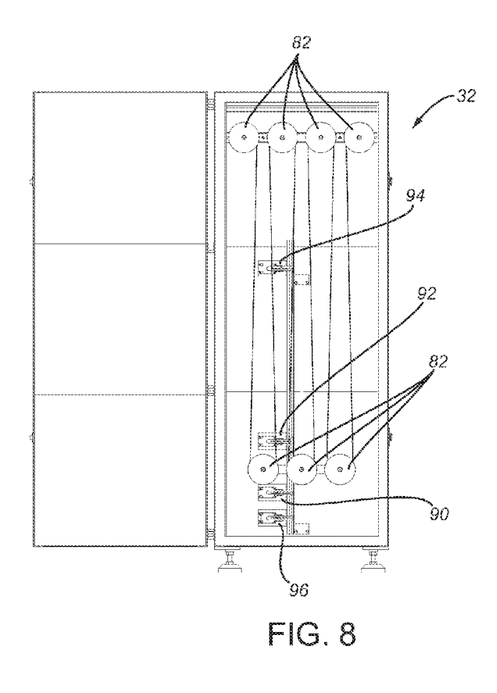
FIG. 8 is a front plan view of the accumulator of FIG. 7.

FIGS. 7-8 illustrate an accumulator 32, which is adjacent the spool change unit 26 and through which the hook fastening tape 18 passes. The accumulator 32 accumulates hook fastening tape 18 received from the spool change unit 26. The hook fastening tape 18 is pulled through accumulator 32 by way of feed motor 40 of the cutting and discharge unit 34 (described below and shown in FIG. 9). In some systems, the accumulator 32 also helps straighten the hook fastening tape 18 as it travels through the accumulator 32 by way of rollers 82. Accumulator 32 includes a first switch 90 and a second switch 92 and an upper limit switch 94 and a lower limit switch 96. The first and second switches 90 and 92 provide a second input for determining the operation of feed motor 70. In particular, the first and second switches 90 and 92 determine a relative amount of the hook fastening tape 18 that is present inside the accumulator 32. In some systems, the switches 90 and 92 detect whether the length of the tape 18 inside the accumulator has increased or decreased based on the position of the tape relative to the switches 90 and 92. When the switches detect that the tape 18 inside the accumulator has decreased, the switches send a signal to the PLC, which in turn operates the motor 70 of the spool change unit so that additional tape is provided to the accumulator 32. In other systems, the speed of the motor 70 can be controlled/regulated based on information received from the switches. When the switches detect that the tape 18 inside the accumulator has increased, the switches send a signal to the PLC, which in turn shuts off the motor 70 of the spool change unit so no additional tape is provided to the accumulator 32. In this way, the accumulator regulates operation of the motor 70 and thus the amount of tape 18 feeding through the spool change unit 26 and into the accumulator 32 so that the cutting and discharge unit 34 (discussed below) does not have to stop every time the spool change unit 26 stops. In other words, the accumulator regulates between the motor 70 of the spool change unit and the feed motor 40 of the cutting and discharge unit so that these two motors act independently of one another.

The upper and lower limit switches 94 and 96 provide an indication that the length of hook fastening tape inside the accumulator 32 has reached an operational threshold indicating that there is a problem in the system.

In some systems, the accumulator 32 also serves as a heat chamber unit and applies heat to the hook fastening tape 18 to produce a more flexible hook fastening tape. For instance, some molds 14 include curved trenches, and a more flexible tape is needed to fit the contours of the curved trenches. Heating the tape makes the tape more flexible. In some systems, the hook fastening tape 18 travels through the accumulator 32 for approximately 10 seconds. In some systems, the temperature inside the accumulator is between approximately 130 and 140 degrees Celsius, which heats the tape to a temperature of about 55 degrees Celsius. The time in the accumulator and/or the temperature of the accumulator can be adjusted depending on the desired temperature and/or flexibility of the tape and/or the desired speed and/or the amount of the tape entering the cutting and discharge unit 34.

Figures 9, 10:
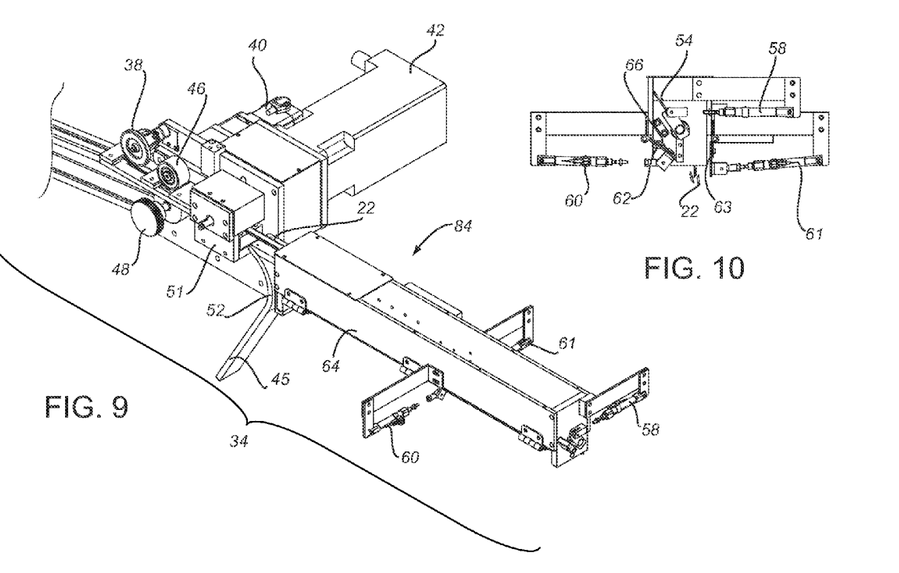
FIG. 9 is a perspective view of the cutter and discharge unit of the feed assembly of FIG. 2.
FIG. 10 is an end plan view of the cutter and discharge unit of FIG. 9.
Figure 11:
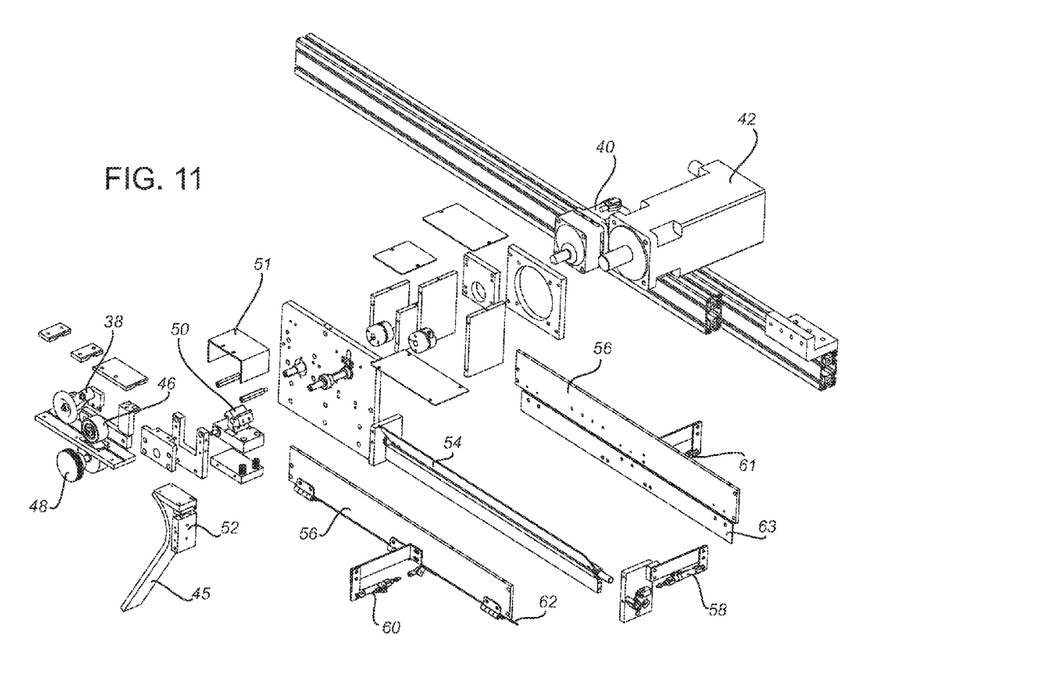
FIG. 11 is an exploded view of the cutter and discharge unit of FIG. 9.

Once the hook fastening tape 18 exits the accumulator 32, the hook fastening tape 18 enters the cutting and discharge unit 34. FIGS. 9-11 illustrate the cutting and discharge unit 34, an end of which is adjacent the accumulator 32 and the other end of which is positioned with respect to the mold assembly line 12. In some systems, hook fastening tape 18 is supplied from the accumulator 32 to the cutting and discharge unit 34 at a rate of approximately 390 mm/second.

Figure 12:
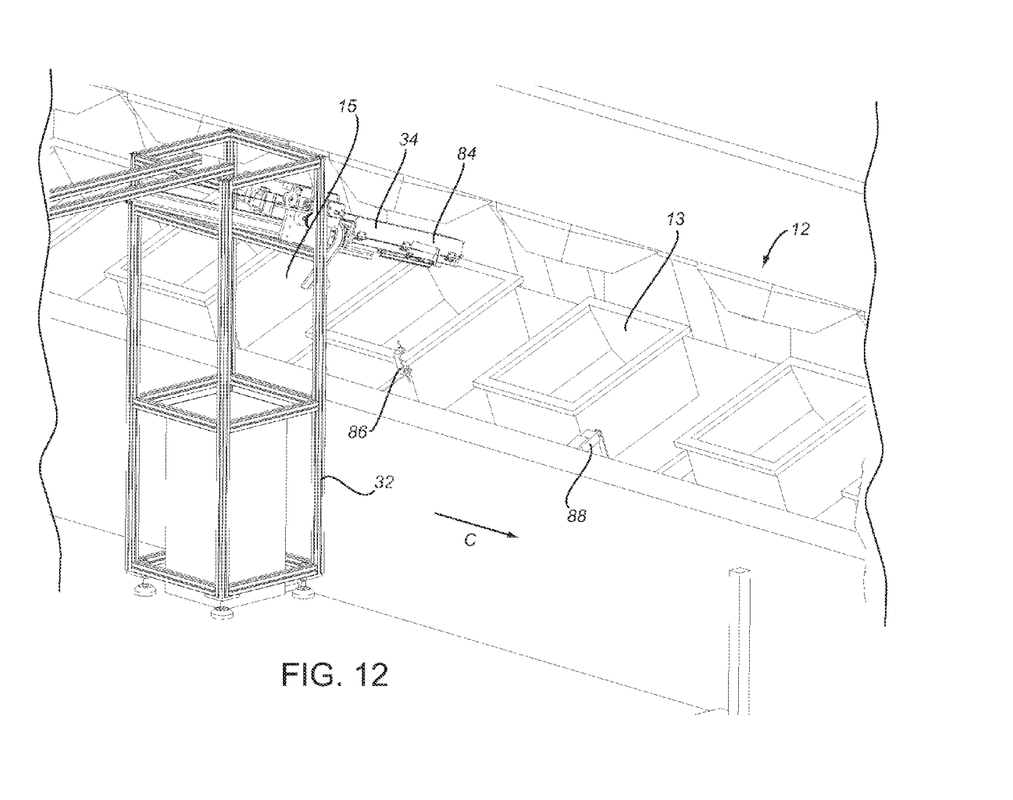
FIG. 12 is a close up perspective view of the feeder assembly and mold assembly line of FIG. 2.

As shown in FIG. 9, the cutting and discharge unit 34 includes an encoder 38 that contacts the hook fastening tape 18 as it enters the cutting and discharge unit 34. The encoder 38 senses the length of the hook fastening tape 18 entering the cutting and discharge unit 34 from the accumulator 32, and communicates this length to a programmable logical controller (PLC), which can be any suitable programmable logical controller. In some systems, the PLC associated with the cutter and discharge unit is a separate PLC from the one that controls the feed motor 70 of the spool change unit. In other systems, a single controller may control both the operation of both the spool change unit and the cutting and discharge unit. As discussed above, hook fastening tape 18 is pulled through the accumulator 32 and into the cutting and discharge unit 34 by feed motor 40, which can be any suitable speed control motor. Feed motor 40 turns roller 46, through which the hook fastening tape 18 passes. The speed of feed motor 40 is adjustable, but is preprogrammed to operate at a set speed that is based on the speed of the mold assembly line 12, which moves in the C direction as shown in FIG. 12, as well as the maximum total length of the required strips 22 used in the largest mold configuration to be run on mold assembly line 12. This allows the motor to meet the number and length requirements of all combinations of a lesser total length of cut strips 22 used in any other mold traveling along the mold assembly line. The cutting and discharge unit 34 also includes feed motor 40 and rotary cutter motor 42, both of which are housed inside enclosures as illustrated in FIG. 9. In some systems, the feed motor and the rotary cutter motor are part of a 1.5 axis motion controller system. In some systems, the cutting and discharge unit 34 includes a knob 48 that enables manual indexing of the hook fastening tape 18 through the unit.

Rotary cutter motor 42 drives rotary cutter 50 (located inside enclosure 51), which cuts the hook fastening tape 18 into strips 22 having a predetermined length. The operation of the rotary cutter motor 42 is controlled by the PLC associated with the cutting and discharge unit. The PLC synchronizes the rotational speed and timing of rotary cutter 50 and roller 46 so that a clean cut is achieved and the correct length of hook fastening tape 18 is cut. As discussed above, joiner 74 of spool change unit 26 staples the ends of different hook fastening tapes 18 together. The PLC controls the rotary cutter 50 and thus determines the length to which the strips 22 will be cut.

A joint detector (not shown) positioned between the accumulator 32 and the cutting and discharge unit 34 detects whether there is metal associated with the hook fastening tape 18 (i.e., whether a staple joins two pieces of hook fastening tape). If metal is detected, the joint detector sends a signal to the PLC, which in turn sends a signal to the rotary cutter 50 to cut the hook fastening tape 18 into a strip having a greater length than the maximum length strip to be used with the molds. Regardless of whether metal has been detected, the cut hook fastening strip 22 then passes through a separator 52.

If the detector senses the presence of a metal staple within hook fastening tape 18, the detector also sends a signal to separator 52 to pivot so that the cut hook fastening strip 22 containing the metal staple is ejected from the feeder assembly. In this way, the cut strip 22 containing the metal staple is discarded by way of the separator 52. Specifically, the separator 52 pivots so that the cut strip 22 containing the staple slides down a chute 45 and is ejected from the line. Numerous suitable ways can be used to eject a cut strip 22 containing a metal staple from the line. If a metal staple is not detected by the detector, the separator 52 remains in a substantially horizontal position (as shown in FIG. 9) and the cut hook fastening strip 22 continues over the separator 52 and into a dispensing tray 84.

The cut hook fastening strips 22 are guided by divider 54 (shown in FIGS. 10-11) into either a first or second section of the dispensing tray 84 based on the orientation of divider 54 for reasons discussed below. In the system discussed, the first side is referred to as the left side and the second side is referred to as the right side, but other orientations are possible (top, bottom, etc.). Flap actuator 58 drives the movement of divider 54 into either a left side orientation or a right side orientation. In some systems, the flap actuator 58 is a linear pneumatic actuator controlled by the PLC. The left side of the dispensing tray 84 includes a left bottom flap 63 and the right side of the dispensing tray 84 includes a right bottom flap 62, both of which are positioned above mold assembly line 12 (see FIG. 12).

Left bottom flap 63 and right bottom flap 62 are respectively driven by bottom flap actuators 60 and 61 from a closed position into an open position. In some systems, the bottom flap actuators 60 and 61 are linear pneumatic actuators and are controlled by the PLC. In the closed position, hook fastening strips 22 are collected and contained by the bottom flaps 62 and/or 63. FIG. 10 illustrates the right bottom flap 62 in the closed position. In the open position, the bottom flap is moved to a substantially vertical orientation so that any hook fastening strips 22 that were collected on bottom flap 62 fall through to mold assembly line 12. FIG. 10 illustrates left bottom flap 63 in the open position and shows hook fastening strips 22 falling by gravity. Bottom flap actuators 60 and 61 are positioned on both sides of the dispensing tray 84 and respectively drive the movement of left bottom flap 63 and right bottom flap 62 between their open and closed positions. FIG. 10 illustrates divider 54 as positioned (via flap actuator 58) to block entry into the left side of the dispensing tray 84 so that hook fastening strips 22 are directed into the right side of dispensing tray 84. As mentioned, the left actuator 61 has moved left bottom flap 63 so that the hook fastening strips 22 housed within the right side of dispensing tray 84 fall directly onto the mold assembly line 12 while right bottom flap 62 remains in place as a floor to contain hook fastening strips 22 located on the left side of the dispensing tray 84.

Because a given mold 14 can require different sized hook fastening strips, the different sides of the dispensing tray 84 can be used to accumulate strips of a similar length. As one example, hook fastening strips of one size may be directed by the divider 54 to left side of the dispensing tray 84 and hook fastening strips of a different size may be directed by the divider 54 to the right side of the dispensing tray 84. Because dispensing tray 84 is positioned above the mold assembly line, molds 14 traveling along mold assembly line 12 will pass under dispensing tray 84. In some instances, the bottom flaps 62 and 63 operate independently so they drop strips at different times. In other instances, both of the bottom flaps 62 and 63 activate at the same time.

Each mold 14 traveling along mold assembly line 12 includes an RFID tag that contains a number. This number can be used by the PLC to identify the number of hook fastening strips required for that particular mold, as well as the length of the hook fastening strips required for that mold, both of which are determined using data stored in memory that is accessed by the PLC. When the RFID tag is read by a sensor 88 (shown in FIG. 12), the sensor 88 sends the index number of the mold to the PLC. Based on the stored information about the length of the hook fastening strips required for a mold, as well as the number of strips required for a particular mold and the timing of when that particular mold will travel along the C direction and pass under the dispensing tray 84 (FIG. 12), the PLC determines the speed of the rotary cutter 50 and the feed motor 40.

In some systems, mold assembly line 12 includes a no electricity zone 16 (shown in FIG. 2) to the left of the cutting and discharge unit 34. The zone is designated as a no electricity zone because the molds are cleaned and waxed in this area and the wax is flammable. In these systems, the RFID sensor cannot be positioned on the mold assembly line 12 proximate to the no electricity zone 16 and thus must be positioned to the right of the cutting and discharge unit 34 (and thus after the molds have already passed under the dispensing tray 84 of the cutting and discharge unit 34). To account for this, each mold includes an RFID tag that carries information for a mold that is behind that particular mold. For example, as shown in FIG. 12, mold 13 may include an RFID tag that carries information for mold 15, which is located behind mold 13 when the molds are traveling along the line 12 in the C direction. The feeder assembly system is programmed so that when the sensor 88 sends information to PLC about the number of strips required for a mold and the required length of those strips, the PLC takes into account the distance between two adjacent molds 14 and the speed of the mold assembly line 12 to determine the proper speed for the hook fastening tape to travel through the cutting and discharge unit 34 so that a hook fastening strip cut to the appropriate length is discharged onto a mold 14 traveling along the mold assembly line 12 at the proper time. If the mold assembly line 12 does not include a no electricity zone, the RFID sensor 88 can be positioned so that the mold 14 passes by it before reaching the cutting and discharge unit 34, in which case the RFID tag associated with a particular mold carries identifying information for that particular mold and not a preceding mold.

Mold assembly line 12 also includes a proximity sensor 86 (FIG. 12), which senses when a mold 14 is traveling under the dispensing tray 84 of the cutting and discharge unit 34 of the feeder assembly 10. When a mold 14 travels across proximity sensor 86, the proximity sensor 86 sends a signal to the PLC, which activates actuators 60 and 61 and moves left bottom flap 62 and/or right bottom flap 63 so that the cut fastener strips 22 drop directly into the mold 14 as it passes beneath the dispensing tray 84 of the cutting and discharge unit 34. In some systems, the PLC receives the information from the sensors, but in other systems, the system could include a separate receiver and a separate controller.

Figure 13:
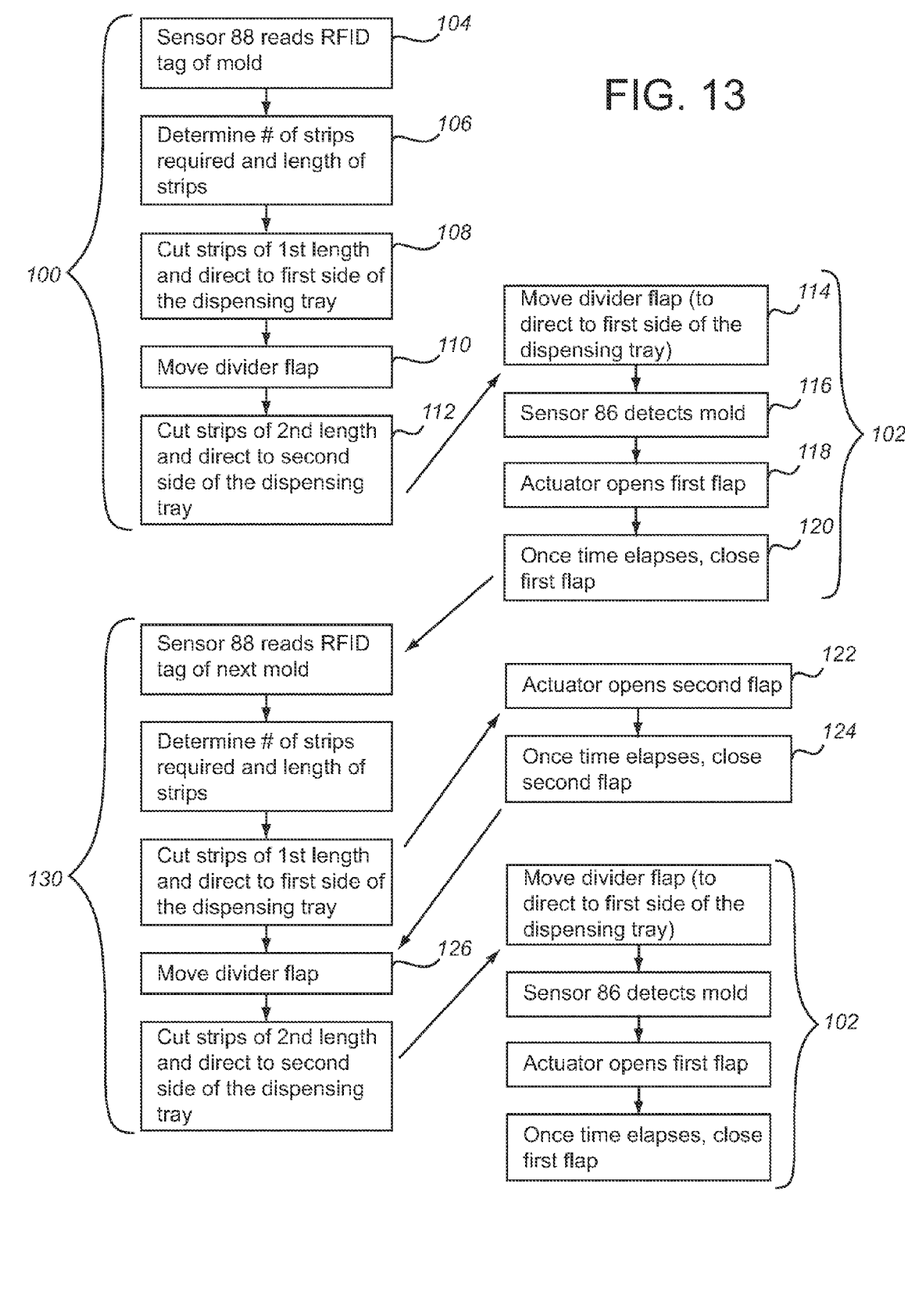
FIG. 13 is a flow chart of an exemplary operation of the feeder assembly and the mold assembly line.

As one non-limiting example, FIG. 13 is a flow chart detailing the operation of the feeder assembly 10 and the mold assembly line 12 according to one particular implementation. In this particular example, there is both a cutting operation 100 and a discharge operation 102. The cutting operation 100 starts when a mold, such as mold 13, passes by sensor 88. As shown in block 104, sensor 88 reads the RFID tag of mold 13. In this particular implementation, the RFID tag of mold 13 may have information corresponding to mold 15, which is several molds behind mold 13. As shown in block 106, the PLC then determines the number of hook fastening strips 22 required for mold 15 and the length of those strips. In some systems, the strips required for mold 15 may all be the same length, or the strips may have different lengths. In this particular example, it is assumed that mold 15 requires strips having a first length and a second length. As shown in block 108, the PLC then directs the cutter 50 to cut strips of the first length. These cut strips of the first length are then directed to a first side of the dispensing tray 84, as described above, such as the left side of the dispensing tray 84. As shown in block 110, the divider 54 then moves to cover the first side, such as left side, of the dispensing tray 84 so that strips will be directed into the other side, such as the right side, of the dispensing tray 84. As shown in block 112, the PLC then directs the cutter 50 to cut strips of the second length and, due to the positioning of the divider, these strips then being directed into the other side, such as the right side, of the dispensing tray 84.

In this system, the required strips for mold 15 are cut and in the dispensing tray 84 before mold 15 reaches sensor 86. Once the cutting operation of strips of the second length is completed, the discharge operation 102 then commences. In some systems, during the discharge operation 102, the cutter 50 is not operating for some or all of the discharge process. As shown in block 114, the divider moves to direct cut strips 22 into the first side, such as the left side, of the dispensing tray 84. As shown in block 116, as mold 15 passes over sensor 86, the sensor detects the mold and then, as shown in block 118, sends a signal to the PLC to actuate the actuator controlling the flap associated with the first side of the dispensing tray 84. In this example, the first side is the left side and thus the left flap 63 is moved by actuator 61 to empty the strips stored in the left side of the dispensing tray 84 into mold 15. As shown in block 120, after a predetermined amount of time has passed, the flap, such as left flap 63, closes. The cutting operation 130 then commences for the next mold (the mold behind mold 15). After the cutting operation 130 is commenced, and before the cutter begins cutting strips of the second length, discharge operation 122 begins to empty the contents stored in the second side of dispensing tray 84 into mold 15 (shown at block 122). After the second flap has closed (block 124), the divider moves (block 126 as part of cutting operation 120) and the cutter then begins cutting strips of the second length and directing them into the second side of the dispensing tray 84. The discharge process 102 then commences and the process repeats as additional molds are sensed. There are several other ways of automating the cutting of hook fastening tape 18 into strips 22 as described above, however, other than the particular example illustrated in FIG. 13. As one of many examples, the cutting could be automated using the distance between molds. Moreover, as explained above, the steps shown at blocks 110, 112, 122, and 124 are optional—if a mold only requires one length of fastening strip 22, such steps would not be utilized.

Figure 14:
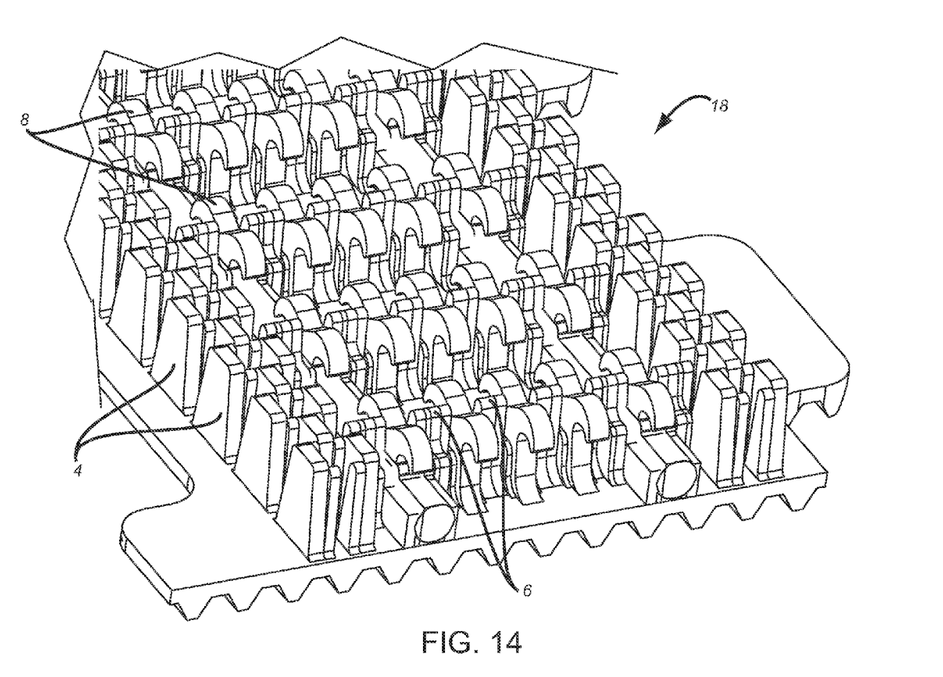
FIG. 14 is a perspective view of a portion of an exemplary hook fastening strip.

As shown in FIG. 14, hook fastening tape 18 includes, among other elements, a plurality of layers of hooks 8. Hook fastening tape 18 also includes a plurality of walls 4 and a plurality of layers of fingers 6, which prevent foam from flowing into the tape and into the hooks 8. The walls 4 and fingers 6 are positioned so that foam is prevented from flowing into the hooks of the tape 18 regardless of where the tape 18 is cut. Thus, the structure of the tape 18 shown in FIG. 14 is particularly well suited for automated cutting by a machine such as the feeder assembly 10 described above.

Also disclosed is a method of using a feeder assembly 10 in conjunction with a mold assembly line 12 to automate the cutting of hook fastener tape into strips having a predetermined length and dropping those strips into the correct mold at the appropriate intervals. Using machinery such as the feeder assembly 10 disclosed above to automate the cutting of hook fastening tape into strips based on the particular characteristics of the mold used in the mold assembly line results in significant cost savings. For example, cost savings are achieved by eliminating a parts rack storing various sized hook fastening strips, as well as no longer requiring an operator who moves between the assembly line and the parts rack. Not only are there savings associated with reduced labor costs, but with receiving and warehousing boxes of pre-cut hook fastening strips of different lengths. There are also cost savings with eliminating the parts rack storage space, as well as the corrugated waste from the boxes in which the pre-cut hook fastening strips were shipped.

The foregoing is provided for purposes of illustration and disclosure of configurations of the invention. It will be appreciated that those skilled in the art, upon attaining an understanding of the foregoing may readily produce alterations to, variations of, and equivalents to such configurations. For example, instead of bottom flaps, the receiving tray could have end flaps so that the cut strips exit through the end of the receiving tray instead of the bottom of the receiving tray. The cut strips can be deposited into a tray or other receptacle or location proximate to the mold instead of the mold. Moreover, air blower jet(s) could be used to propel the cut strips 22 into the dispensing tray 24 of cutting and discharge unit 34. Accordingly, it should be understood that the present disclosure has been presented for purposes of example rather than limitation, and does not preclude inclusion of such modifications, variations and/or additions to the present subject matter as would be readily apparent to one of ordinary skill in the art.

For example, the arrangement of the feeder assembly can be modified depending on space constraints and other requirements. As one example, in some systems, the spacing between the spool change unit and the accumulator and/or the spacing between the accumulator and the cutting and discharge unit is varied. In other systems, the configuration of the accumulator with respect to the cutting and discharge unit is varied.

In another variation, the speed of the feed motor 70 of the spool change unit can be varied based on the demand for the hook fastening tape in the cutter and discharge unit based on the speed of the mold assembly line. Moreover, in some implementations, the feed motor 70 of the spool change unit and the feed motor 40 of the cutting and discharge unit run independently of one another, but in other implementations, their operation may be synched.

The invention claimed is:

1. A system for cutting and delivering a plurality of strips of hook fastening tape to each of a plurality of molds moving along a mold assembly line, the system comprising:
   a receiver configured to receive information identifying a position of a selected one of the plurality of molds, a number of strips of hook fastening tape required for the selected mold, and a length of the number of strips of hook fastening tape;
   a motor configured to feed hook fastening tape to a cutter;
   the cutter configured to cut the hook fastening tape into the strips of hook fastening tape;
   a receiving tray configured to receive the strips of hook fastening tape, wherein the receiving tray includes a divider configured to divide the receiving tray into at least a first and a second section, a first flap associated with the first section of the receiving tray, and a second flap associated with the second section of the receiving tray;
   a divider actuator configured to control the position of the divider;
   a first flap actuator configured to control the position of the first flap;
   a second flap actuator configured to control the position of the second flap;
   a controller configured to control the motor, the cutter, the divider actuator, the first flap actuator and the second flap actuator,
   wherein in response to receiving information identifying the number of strips for the selected mold and the length of the number of strips, the controller is configured to control the motor and the cutter to cut the number of strips of hook fastening tape for the selected mold and to control the divider actuator to position the divider so that the number of strips are directed to the first section of the receiving tray, and
   wherein in response to receiving information that the position of the selected mold is proximate the receiving tray, the controller is configured to control the first flap actuator so that the first flap opens and the number of strips are directed towards the selected mold.

2. The system of claim 1, wherein the received information identifies a second number of strips of hook fastening tape required for the selected mold and a second length of the number of strips of hook fastening tape,
   wherein the controller is further configured to control the motor and the cutter to cut the second number of strips of hook fastening tape for the selected mold and to control the divider actuator to position the divider so that the second number of strips are directed to the second section of the receiving tray,
   wherein the controller is configured to control the first flap actuator so that the first flap closes after the number of strips are directed towards the selected mold, and to control the second flap actuator so that the second flap opens and the second number of strips are directed towards the selected mold.

3. The system of claim 1, further comprising an encoder, wherein the encoder is configured to determine a length of the hook fastening tape and to communicate the length to the controller.

4. The system of claim 1, further comprising a joint detector, wherein the joint detector is configured to detect a joint in the hook fastening tape and to communicate the detection of the joint to the controller.

5. The system of claim 4, wherein the cutter receives instructions from the controller to cut the hook fastening tape having a joint into a modified strip having a joint length that is greater than the length of the number of strips of hook fastening tape.

6. The system of claim 1, further comprising a first sensor for identifying the position of the selected one of the plurality of molds and a second sensor for reading a mold index number that identifies the number of strips of hook fastening tape required for the selected mold and the length of the number of strips of hook fastening tape.

7. The system of claim 6, wherein at least the second sensor is positioned away from a no electricity zone of the moving mold assembly line.

8. The system of claim 1, wherein the hook fastening tape comprises a plurality of fingers that are positioned to help block foam from flowing into the hook fastening tape regardless of where the cutter cuts the hook fastening tape.

9. A system for cutting and delivering a plurality of strips of hook fastening tape to each of a plurality of molds moving along a mold assembly line, the system comprising:
- a controller configured to receive information as the plurality of molds move along the mold assembly line identifying a position of a selected one of the plurality of molds, a number of strips of hook fastening tape required for the selected mold, and a length of the number of strips of hook fastening tape;
- a motor configured to feed hook fastening tape to a cutter;
- the cutter configured to cut the hook fastening tape into the strips of hook fastening tape;
- wherein in response to receiving information identifying the number of strips for the selected mold, the length of the number of strips, and the position of the selected mold, the controller is configured to control the motor and adjust the cutter in real time so that the cutter cuts the number of strips of hook fastening tape for the selected mold and the length of each of the number of the strips based on the received information identifying the number of strips for the selected mold, the length of the number of strips for the selected mold and timing of when the selected mold will travel along the mold assembly line and be proximate the cutter, and
- wherein the hook fastening tape comprises a plurality of fingers that are positioned to help block foam from flowing into the hook fastening tape regardless of where the cutter cuts the hook fastening tape.

10. The system of claim 9, further comprising a spool changer unit to facilitate feeding of the hook fastening tape from various spools through the system.

11. The system of claim 9, further comprising an accumulator for accumulating the hook fastening tape received from the spool changer unit, wherein the accumulator is located between the spool changer unit and the motor.

12. The system of claim 11, wherein the accumulator heats the hook fastening tape.

13. The system of claim 9, further comprising an encoder, wherein the encoder is configured to determine a length of the hook fastening tape and to communicate the length to the controller.

14. The system of claim 9, wherein the cutter is a rotary cutter.

15. The system of claim 9, further comprising a joint detector, wherein the joint detector is configured to detect a joint in the hook fastening tape and to communicate the detection of the joint to the controller.

16. The system of claim 15, further comprising a separator that is configured to pivot upon detection of the joint in the hook fastening tape to eject the hook fastening tape with the joint from the system.

17. The system of claim 15, wherein the cutter receives instructions from the controller to cut the hook fastening tape having a joint into a modified strip having a joint length that is greater than the length of the number of strips of hook fastening tape.

18. The system of claim 9, wherein the controller adjusts a rotational speed and timing of the cutter based on the received information identifying the number of strips for the selected mold and the length of the number of strips for the selected mold.

19. The system of claim 9, wherein in response to receiving information that the position of the selected mold is proximate the cutter, the number of cut strips is directed toward the selected mold.

* * * * *